(12) United States Patent
Ito

(10) Patent No.: US 7,101,083 B2
(45) Date of Patent: Sep. 5, 2006

(54) DEVICE FOR HOLDING LINEAR GUIDE RAIL

(75) Inventor: Takayoshi Ito, Ichinomiya (JP)

(73) Assignee: Infom Co., Ltd., Aichi-Ken (JP)

( * ) Notice: Subject to any disclaimer, the term of this patent is extended or adjusted under 35 U.S.C. 154(b) by 132 days.

(21) Appl. No.: 10/911,064

(22) Filed: Aug. 4, 2004

(65) Prior Publication Data

US 2006/0029309 A1   Feb. 9, 2006

(51) Int. Cl.
*F16C 29/06* (2006.01)
(52) U.S. Cl. .......................... 384/45; 384/40
(58) Field of Classification Search ................. 384/45, 384/43, 44, 40
See application file for complete search history.

(56) References Cited

U.S. PATENT DOCUMENTS 5,011,300 A * 4/1991 Teramachi ............... 384/45
5,772,333 A * 6/1998 Yabe et al. ............... 384/45

* cited by examiner

*Primary Examiner*—Lenard A. Footland
(74) *Attorney, Agent, or Firm*—Darby & Darby

(57) ABSTRACT

A device for holding a linear guide rail R along a linearly extending vertical reference surface L formed on an installation surface f provided with a vertical counter surface F, including a pressing plate 5, and first and second pressure contacting piece 7 and 6. The pressing plate 5 has a central fitting hole 11 and inwardly downwardly tapered side surfaces 10b, 10a which are face-to-face engageable with tapered side faces 15, 14 of the first and second pieces 7 and 6. When a screw 31 inserted through the fitting hole 11 of the pressing plate is tightened into the female thread hole 30 of the installation surface f, the pressing plate is moved downward so that the first and second pieces 7 and 6 are moved to press the guide rail R positioned on the installation surface f between the reference surface L and the second piece 6 against the reference surface L.

9 Claims, 15 Drawing Sheets

DEVICE FOR HOLDING LINEAR GUIDE RAIL

BACKGROUND OF THE INVENTION

1. Field of the Invention

This invention relates to a holding device for a linear guide rail applied to a machining center or a lathe for slidably guiding a machine tool or the like in the longitudinal direction thereof.

2. Description of Prior Art

A linear guide rail R for slidably guiding a machine or the like in the longitudinal direction thereof as shown in FIG. 14 is widely used as a machine element. When the linear guide R is installed, it is positioned in contact with a vertical reference face L extending vertically from an installation surface f, and a plurality of bolts j are threaded into corresponding threaded holes i formed in the installation surface f through holes h formed through the guide rail R at specified intervals and having a large diameter.

In such a configuration, however, even when the vertical reference face L has an even and uniform surface, the guide rail R may not snugly fit against the reference face L because of various reasons, such as inherent distortion and loss of linearity of the linear guide rail R, design tolerance of the threaded holes I, deformation of the bolts j during tightening and positional deviation between the holes h and their corresponding threaded holes i. This results in low accuracy of positioning of the linear guide rail R and causes distortion in movement of the machine mounted thereon. Especially, in the case of a machine tool for precision machining, the low positioning accuracy of the linear guide rail R may cause various drawbacks such as lowering of the yield of the products.

In addition, the holes h must be formed through the linear guide rail R with high accuracy at positions coincident with their corresponding threaded holes i, and such machining of the holes h takes time and effort. When the linear guide rail R is damaged or worn or requires shape modification, it is necessary to machine the rail. The machining of the rail, however, cannot be made quickly. Furthermore, in fixing the linear guide rail R, the holes h are first aligned with the corresponding threaded holes i and the bolts j are sequentially threaded into the corresponding threaded holes i from above. This also takes time and effort.

To overcome the above problems, a holding device for positioning a guide rail is proposed in Japanese Patent No. 2709416. The holding device comprises an eccentric pressure contact plate engageable with one side of the linear guide rail to press the other side thereof against a vertical reference face, a revolving shaft part which has a tool hole, a vertical slot and a female thread with a pressure surface edge on its bottom end along its central axis and which can be snugly fitted in an insertion hole formed in an installation surface of a base, and a pressure screw having an operating groove in one end for pressing the pressure surface edge of the revolving shaft part downward to extend the slit portion of the revolving shaft part outward when it is threaded downward. The revolving shaft part is fitted in the insertion hole, and a tool such as a hexagonal wrench is inserted in the tool hole in the top of the eccentric pressure contact plate and rotated to rotate the eccentric pressure contact plate. Then, the distance from the revolving shaft part to a position where the pressure contact plate meets the linear guide rail is varied since the pressure contact plate has an eccentric shape. Thereby, the peripheral face of the eccentric pressure contact plate is pressed against a side of the linear guide rail.

With the above configuration, when a force beyond a permissive level is applied to the pressure contact plate, the center of the revolving shaft part is shifted, and the linear guide rail cannot be sufficiently held. Further, when the tool is from the tool hole, the eccentric pressure contact plate is likely to be rotated in reverse by a reaction force. Therefore, the pressing operation must be performed once again. In addition, since the linear guide rail is held by the eccentric pressure contact plate through a line contact rather than a face-to-face contact, the guide rail is not sufficiently firmly held.

SUMMARY OF THE INVENTION

A holding and positioning device for a linear guide rail R along a linearly extending vertical reference face L formed on an installation surface f having female thread holes d arranged with predetermined intervals as shown in FIG. 15(*a*) is considered. The device includes a pressing member p having a central through hole c, an inwardly inclined surface n and an engaging surface m opposite to the inclined surface n, and a pressure contacting member z having a pressure receiving side x engageable with the inwardly inclined surface n of the pressing member p and a supporting side y opposite to the pressure receiving side x and engageable with a counter face F formed on the installation surface f in parallel therewith. The engaging surface m is engageable with one side of the rail R. When the screw e is threaded into the female threaded hole d through the central through hole c, the pressing member p is fixed on the installation surface f. In this case, as the rotation of the screw e, the pressing member p moves downward so that the pressure contacting member z is brought into pressure engagement with the counter face F because of the pressure engagement between the inwardly inclined surface n of the pressing member p and the pressure receiving side x of the pressure contacting member z. Therefore, the engaging surface m of the pressing member p is brought into pressure contact with the linear guide rail R so that the guide rail R is pressed against the vertical reference face L with a deformation of the rail R being corrected.

With the above holding device, the direction of the pressing force acting on the inclined surface n of the pressing member p is not symmetrical with that acting on the engaging surface m of the pressing member p. Therefore, the pressing forces acting on both sides of the pressing member p are unbalanced to hinder the stable operation of attaching the pressing member p on the installation surface f. For example, as shown in FIG. 15(*b*), the pressing member p is apt to be attached on the installation surface f in a slanted position. When such a mounting failure occurs, there is a possibility that the guide rail R is not correctly engaged by the reference face L and is not precisely held in position. Even when the guide rail is once precisely held in position, there is a possibility that a positional offset is apt to occur curing service. Thus, it is necessary to detach the pressing member p and to again attach same until mounting failure is properly corrected.

It is, therefore, an object of the present invention to provide a holding device which can solve the above problems and which can precisely holding the linear guide rail in predetermined position.

In accordance with the present invention there is provided a device for holding a linear guide rail along a linearly extending vertical reference surface formed on an installation surface, said linear guide rail having a first side and a second side opposite said first side, said installation surface being provided with a vertical counter surface spaced apart from and in parallel with said reference surface and having a female thread hole formed between said reference surface and said counter surface, said holding device comprising:

a pressing plate having a vertically extending central fitting hole through which a screw is insertible and a pair of opposing, inwardly downwardly tapered, first and second side surfaces, said screw being threadedly engageable with said female thread hole so that said pressing plate is fixed on said installation surface when said screw inserted through said central fitting hole is tightened into said female thread hole;

a first pressure contacting piece having a tapered side face which is face-to-face engageable by said first tapered side surface of said pressing plate and a vertical side face opposite to said tapered side face and face-to-face engageable by said vertical counter surface; and a second pressure contacting piece having a tapered side face which is face-to-face engageable by said second tapered side surface of said pressing plate and a vertical side face opposite to said tapered side face and face-to-face engageable with said first side of said linear guide rail, so that when said linear guide rail and said first and second pressure contacting pieces are arranged on said installation surface in such a position that said first pressure contacting piece is located between said first tapered side surface of said pressing plate and said vertical counter surface, said second pressure contacting piece is located between said second tapered side surface of said pressing plate and said first side of said linear guide rail and said linear guide rail is rested with said second side thereof being adjacent to said vertical reference surface and when said screw inserted through said central fitting hole of said pressing plate is tightened into said female thread hole, said first and second pressure contacting pieces are brought into pressure contact with said vertical counter surface and said first side of said linear guide rail, respectively, to press said second side of said linear guide rail against said vertical reference face.

In the above configuration, when the screw inserted through the central fitting hole of the pressing plate is rotated and is advanced into the female thread hole, the pressing plate is gradually lowered. As a consequence, the first and second pressure contacting pieces, whose tapered side faces are face-to-face engagement with the first and second tapered surfaces of the pressing plate, laterally (i.e. in the direction perpendicular to the longitudinal axis of the linear guide rail R) moves in opposite directions. When the screw is further fastened into the thread hole after the vertical side face of the first pressure contacting piece has been abutted against the vertical counter surface, the second pressure contacting piece is displaced toward the reference surface by the reaction force acting on the first pressure contacting piece and transmitted through the pressing plate, so that the guide rail is displaced and brought into pressure contact with the reference surface. Thus, the first and second pressure contacting pieces serve to function as "wedges" on both sides of the pressing plate and to balance the pressing forces acting on the reference surface and the counter surface.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

Figure 1:
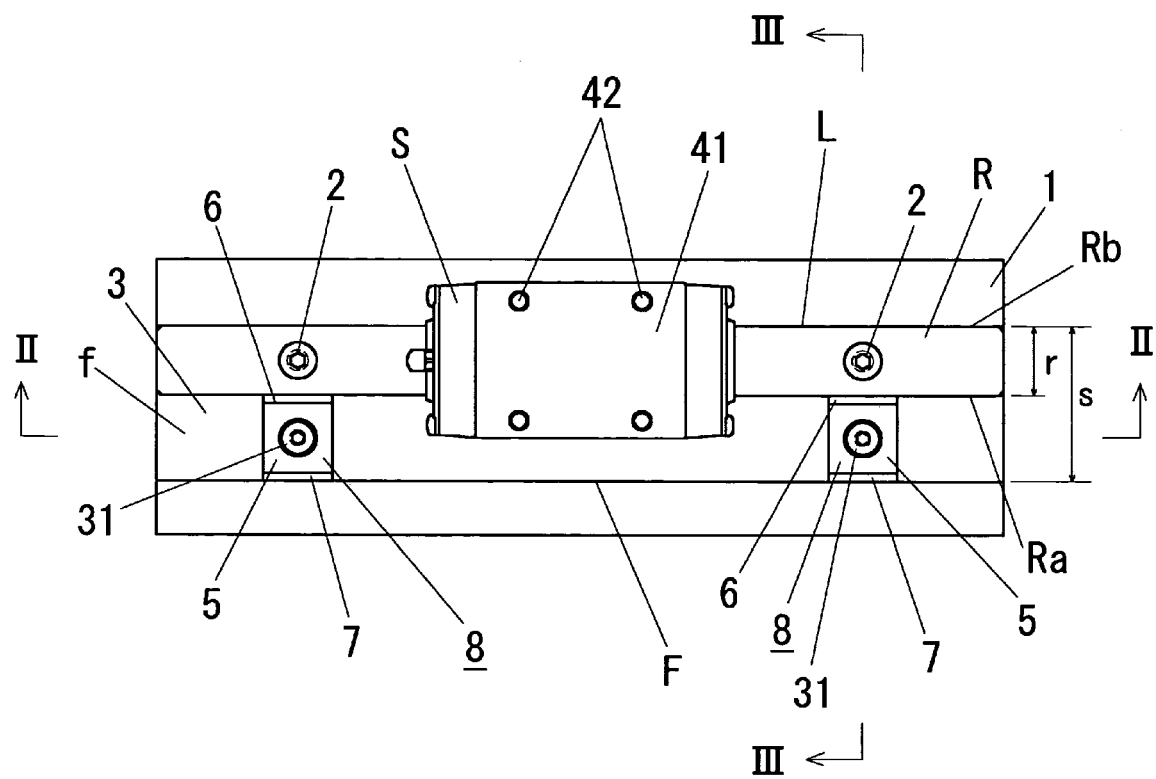
FIG. 1 is a plan view of a base to which a linear guide rail and holding units according to one embodiment of the present invention are attached, each of the units being composed of a pressing plate and a pair of pressure contacting pieces.
Figure 2:
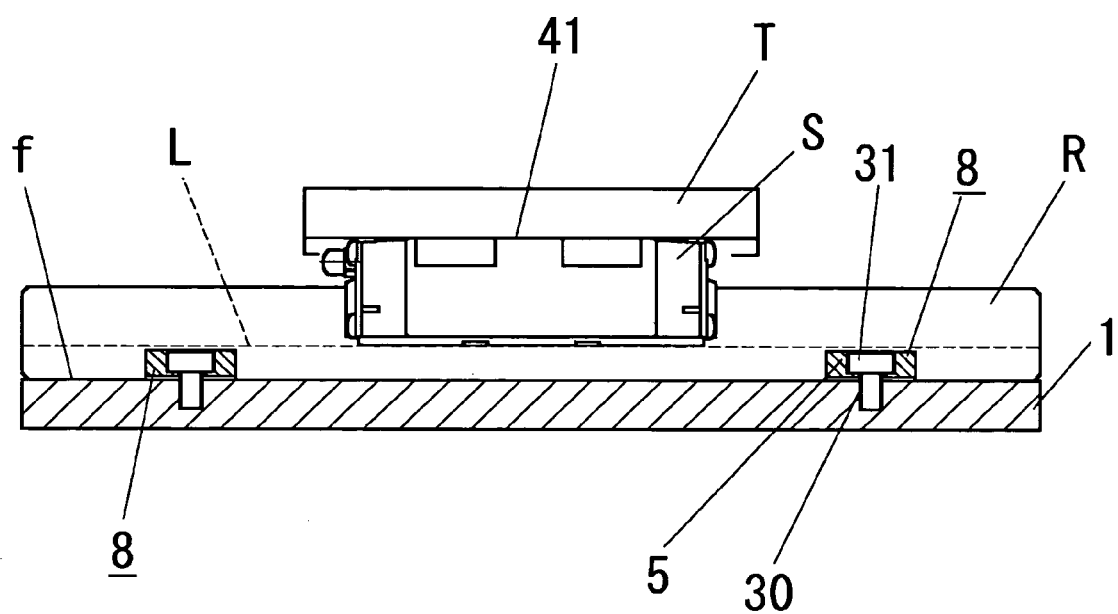
FIG. 2 is a sectional side view taken on the line II—II in FIG. 1.
Figure 3:
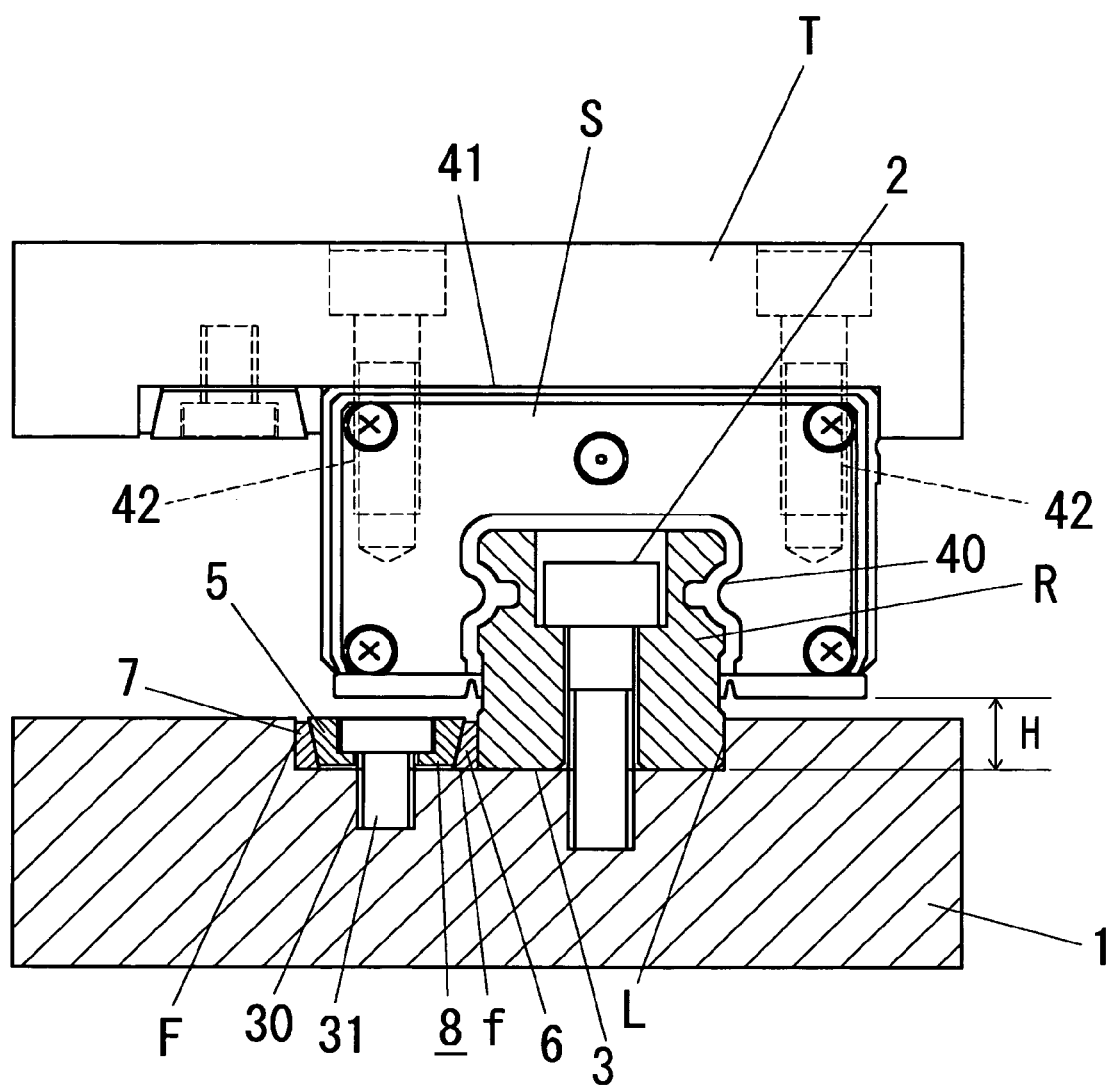
FIG. 3; is a sectional side view taken on the line III—III in FIG. 1.

Description will be hereinafter made of the embodiments of the present invention with reference to accompanying drawings. Referring first to FIG. 1 to FIG. 3, designated as 1 is a base on which a linear guide rail R having a first side Ra and a second side Rb is adapted to be fixedly secured by bolts 2. A linear slider S for mounting a machine tool T or the like thereon is mounted on the linear guide rail R for linear sliding movement along the linear guide rail R. The linear slider S has a fitting groove 40 shaped to match the cross-sectional shape of the linear guide rail R and a mounting face 41 for mounting the machine tool T thereon. Fitting screw holes 42 for fixing the machine tool T are formed vertically in the mounting face 41 along opposite edges thereof (see FIG. 3).

When the securing bolts 2 are not tightened, the linear guide rail R can be slightly moved with respect to the securing bolts 2. Thus, in the state where the securing bolts 2 are in a loosened state, the linear guide rail R is pressed against a vertical reference face L by holding units of the present invention which will be described below. Then, the securing bolts 2 are tightened to secure the linear guide rail R. By being pressed against the vertical reference face L, the linear guide rail R curved in the order of, for example 0.01 mm, may be straightened. Thus, the linear slider S mounted on the guide rail R can be linearly slid smoothly.

The base 1 is provided with a longitudinally extending groove 3 defined by the vertical reference surface L, a vertical counter surface F in parallel with and laterally spaced apart from the vertical reference surface L and a bottom installation surface f extending between the vertical reference surface L and the vertical counter surface F in the direction normal to the vertical surfaces. The linear guide rail R is placed on the installation surface f and is fixed along the reference surface L by the bolts 2 as described above. A plurality of longitudinally spaced apart female thread holes 30 are formed in the installation surface f.

As used herein the term "longitudinal" is intended to refer to the direction parallel with the lengthwise direction of the linear guide rail R, and the term "lateral" is intended to refer to the direction perpendicular to the lengthwise direction of the linear guide rail R.

The holding device according to the present invention includes a plurality of holding units 8 provided in respective female thread holes. Each of the holding units 8 includes a pressing plate 5 and a pair of first and second pressure contacting pieces 7 and 6.

Figure 4:
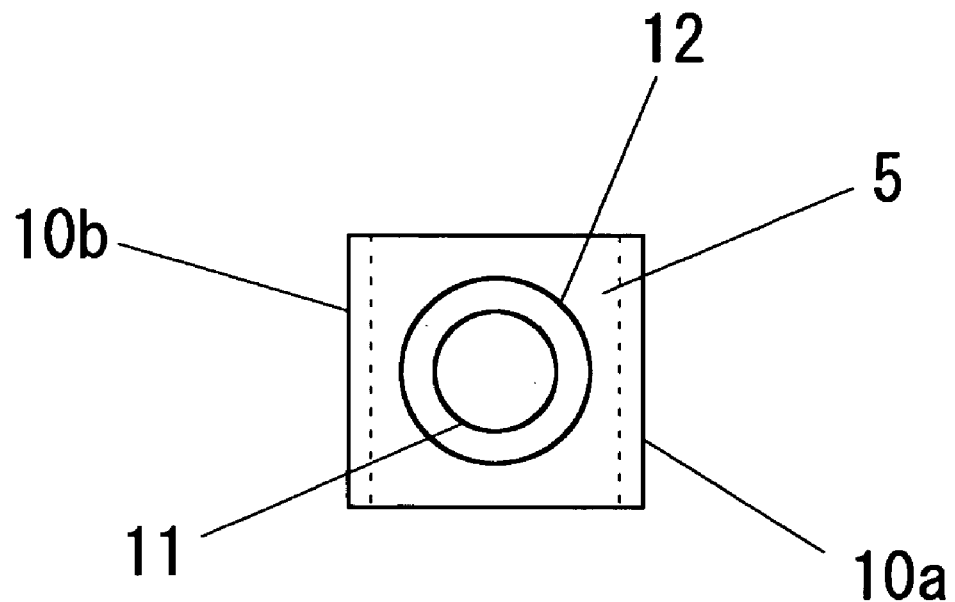
FIG. 4(a) is a plan view of a pressing plate of FIG. 1.
FIG. 4(b) is a vertical cross-sectional view of the pressing plate of FIG. 4(a)
Figure 4:
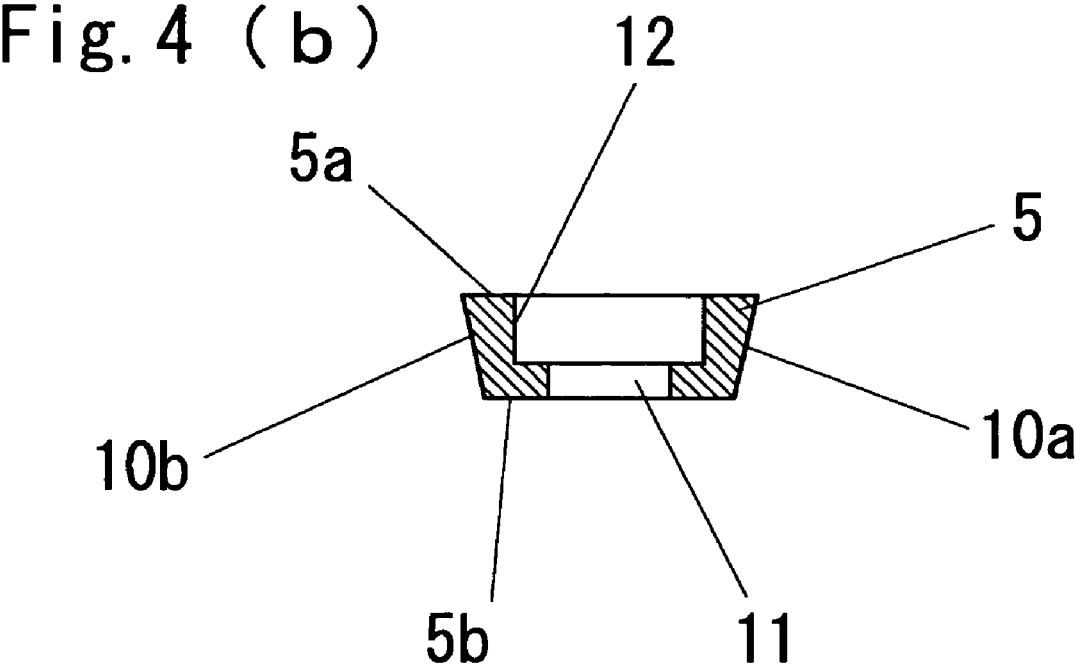

As shown in FIGS. 4(a) and 4(b), the pressing plate 5 has a pair of opposing upper and lower surfaces 5a and 5b, a pair of opposing, preferably symmetrically tapered first and second side surfaces 10b and 10a and a central fitting hole 11 which extends vertically from the upper surface 5a to the lower surface 5b and through which a screw 31 (FIG. 3) is insertible. Each of the first and second side surfaces 10b and 10a is tapered inward and downward so that the cross-sectional area of the pressing plate 5 continuously decreases in the direction from the upper surface 5a to the lower surface 5b. As shown in FIG. 1, the screw 31 is threadedly engageable with the corresponding female thread hole 30 so that the pressing plate 5 can be fixed on the installation surface f when the screw inserted through the central fitting hole 11 is tightened into the female thread hole 30. The fitting hole 11 has a large diameter portion 12 at its upper end to form a stepped portion engageable with an under surface of a head of the screw 31. The depth of the enlarged portion 12 of the fitting hole 11 is suitably adjusted so that the head portion of the screw 31 is not protruded from the upper surface 5a of the pressing plate 5 when the screw 31 is tightened into the female thread hole 30.

Figure 5:
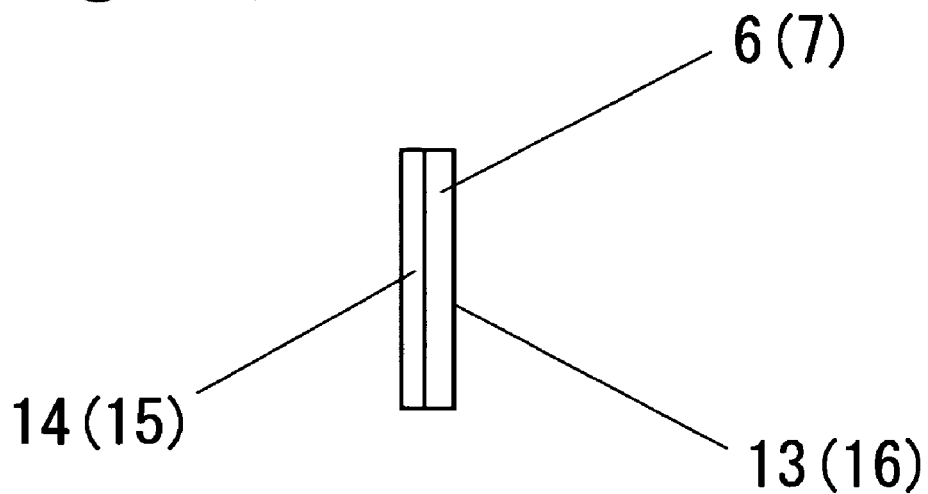
FIG. 5(a) is a plan view of a pressure contacting piece of FIG. 1.
FIG. 5(b) is a side view of FIG. 5(a)
Figure 5:
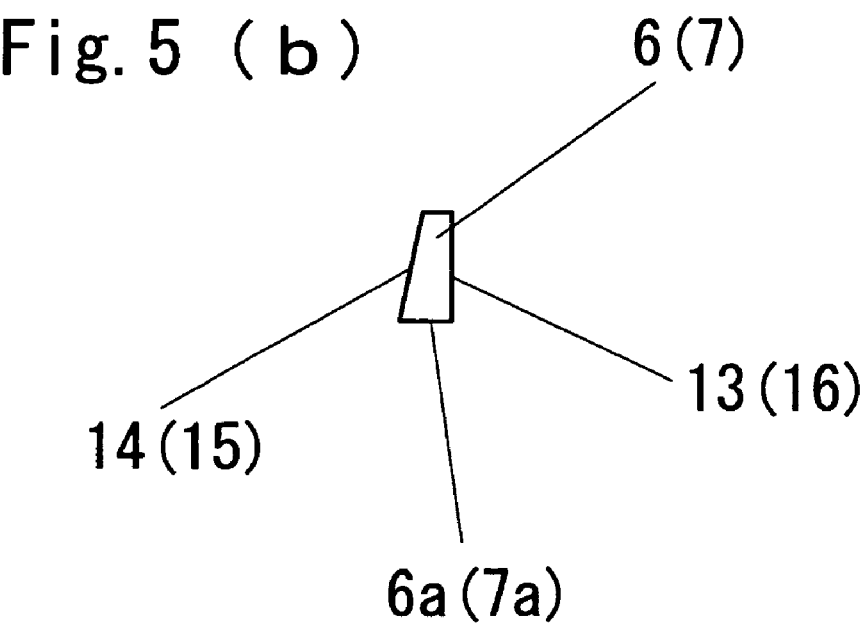

As shown in FIGS. 3, 5(a) and 5(b), the first pressure contacting piece 7 has a bottom face 7a which is laterally slidably engageable with said installation surface f, a tapered side face 15 which is vertically slidably face-to-face engageable with the first tapered side surface 10b of the pressing plate 5 and a vertical side face 16 opposite to the tapered side face 15 and face-to-face engageable by the vertical counter surface F. Similarly, the second pressure contacting piece 6 has a bottom face 6a laterally slidably engageable with the installation surface f, a tapered side face 14 which is vertically slidably face-to-face engageable by the second tapered side surface 10a of the pressing plate 5 and a vertical side face 13 opposite to the tapered side face 14 and face-to-face engageable with the first side Ra of the linear guide rail R.

As a result of the above construction, when the screw 31 inserted through the central fitting hole 11 of the pressing plate 5 is tightened into the female thread hole 30 to displace the pressing plate 5 downward, the tapered side faces 15 and 14 of the first and second pressure contacting pieces 7 and 6 receive pushing forces from the first and second tapered side surfaces 10b and 10a of the pressing plate 5. Therefore, the first and second pressure contacting pieces 7 and 6 are laterally displaced on the installation surface f in opposite directions and brought into pressure contact with the vertical counter surface F and the first side Ra of the linear guide rail R, respectively, to press the second side Rb of the linear guide rail R against the vertical reference face L.

In this case, the lateral sizes of the pressing plate 5 and the first and second pressure contacting pieces 7 and 6 are determined on the basis a difference (s–r) between the lateral width s of the longitudinally extending groove 3 and the width r of the linear guide rail R between the first and second sides Ra and Rb. The sizes of the pressing plate 5 and the first and second pressure contacting pieces 7 and 6 are preferably such that when the first and second pressure contacting pieces 7 and 6 are laterally displaced by the downward movement of the pressing plate 5 until, as shown in FIG. 3, the second side Rb of the guide rail R is brought into contact with the reference surface L with the vertical side face 16 of the first pressure contacting piece 7 being brought into contact with the vertical counter face F, the upper surface 5a of the pressing plate 5 is located above the upper ends of the first and second pressure contacting pieces 7 and 6 (FIG. 7(b)). In this state, the thickness (vertical height) of the pressing plate 5 is preferably such that a small gap is defined between the lower surface 5b and the installation surface f with which the lower surfaces 7a and 6a of the first and second pressure contacting pieces 7 and 6 are engaged. Because of the above configuration, the pressing plate 5 is allowed to be further displaced downward by further tightening the screw 31 into the female thread hole 30, when the contact between the linear guide rail R and the reference surface L is loosened.

In some cases, the distance H (FIG. 3) between the lower surface of the linear slider S and the installation surface f is only 2 to 10 mm. In such a case, the holding unit 8 including the pressure contact pieces 6 and 7 and the pressing plate 5 is required to have a thickness smaller than H. For this reason, the height of each of the first and second pressure contacting pieces 7 and 6 is made smaller than the depth of the groove 3 and, in addition, the head of the fitting screw 31 is prevented from being protruded from the upper surface 5a of the pressing plate 5. Even with such a construction, the holding device of the present invention exhibits a high holding strength.

With the holding device as constructed above, the holding of the linear guide rail R in position along the vertical reference surface is achieved as follows.

Figure 6:
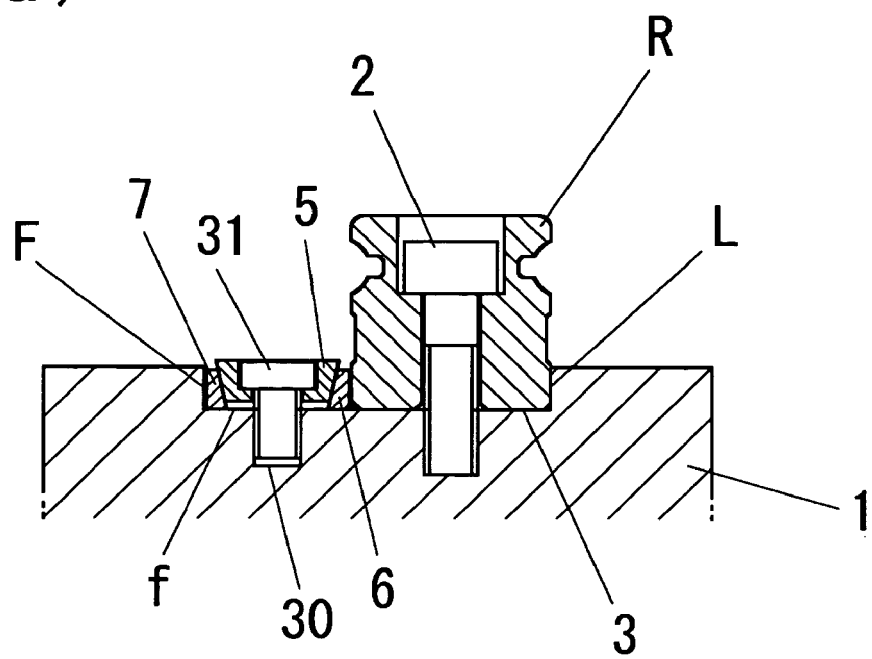
FIG. 6(a) is a sectional view similar to FIG. 3 showing the state of the pressing plate and pressure contacting pieces of FIG. 1 in a pre-fastened state.
FIG. 6(b) is a plan view of FIG. 6(a)
Figure 6:
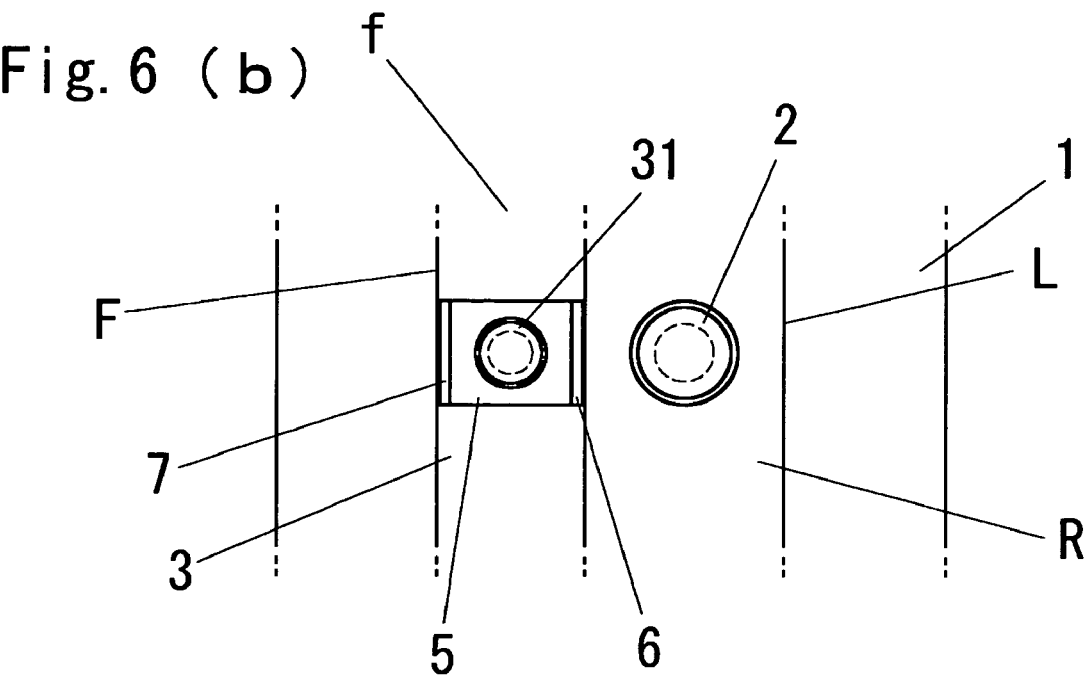

In the state where the bolts 2 are loosened, the linear guide rail R, the pressing plate 5 and the first and second pressure contacting pieces 7 and 6 are arranged on the installation surface f as shown in FIG. 6(a), namely in such a positional relationship that the first pressure contacting piece 7 is located between the first tapered side surface 10b of the pressing plate and the vertical counter surface F, the second pressure contacting piece 6 is located between the second tapered side surface 10a of the pressing plate 5 and the first side Ra of the linear guide rail R, and the linear guide rail R is rested with the second side Ra thereof being adjacent to the vertical reference surface L. Then, the screw 31 loosely fitted through the central fitting hole 11 of the pressing plate 5 is threadedly engaged with the female thread hole 30 formed on the installation surface f. In this state, the pressing plate 5 is supported on the first and second pressure contacting pieces 7 and 6 with the first and second tapered side surfaces 10b and 10a being in face-to-face engagement with the tapered side faces 15 and 14, respectively (FIG. 7(a)). Further, as shown in FIG. 6(b), the pressing plate 5 and the first and second pressure contacting pieces 7 and 6 are laterally aligned to maximize and equalize the contact area between the first tapered side surface 10b and the tapered side face 15 and between the second tapered side surface 10a and the tapered side face 14 and to equally distribute the pressing force from the pressing plate to the first and second pressure contacting pieces 7 and 6.

Figure 7:
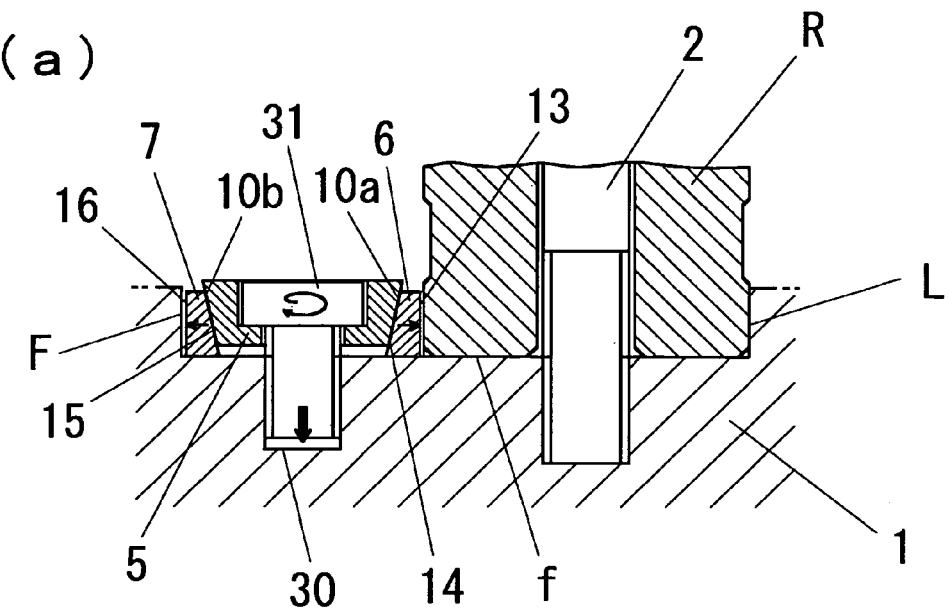
FIG. 7(a) is a sectional view similar to FIG. 6(a) showing the state of the pressing plate and pressure contacting pieces of FIG. 1 in a pre-fastened state.
FIG. 7(b) is a sectional view similar to FIG. 7(a) showing the state of the pressing plate and pressure contacting pieces of FIG. 1 in a fastened state.
Figure 7:
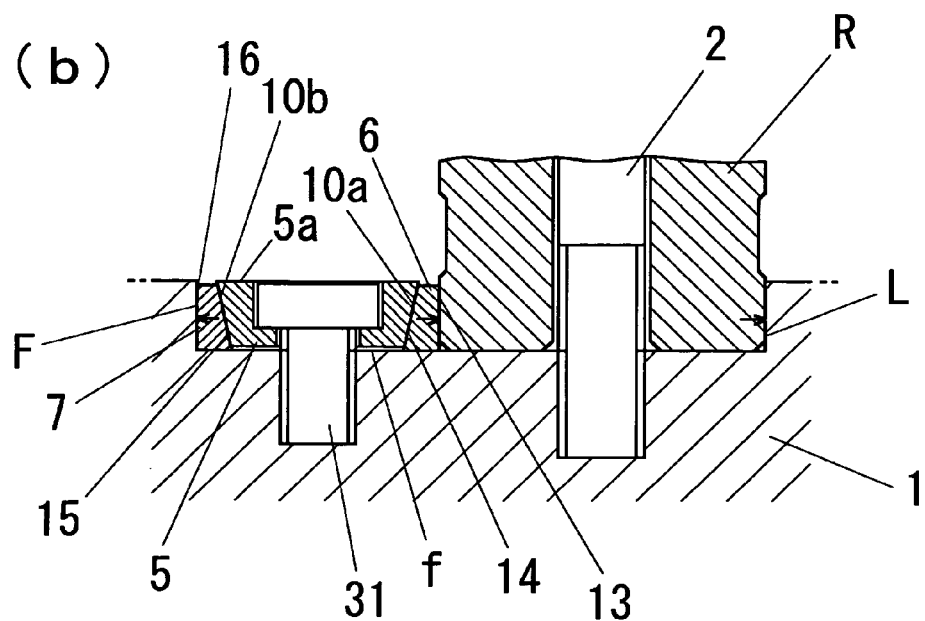

When the screw 31 is rotated and is advanced into the female thread hole 30, the pressing plate 5 is gradually lowered. As a consequence, the first and second pressure contacting pieces 7 and 6, whose tapered side faces 15 and 14 are face-to-face engagement with the first and second tapered surfaces 10b and 10a of the pressing plate 5, laterally slide on the installation surface f in opposite directions. When the screw 31 is further fastened into the thread hole 30, the vertical side face 16 of the first pressure contacting piece 7 is brought into pressure contact with the vertical counter surface F, while the second side Rb of the linear guide rail R is brought into engagement with the reference surface L with the vertical side face 13 of the second pressure contacting piece 6 being in pressure engagement with the first side Ra of the linear guide rail R. With a further downward movement of the pressing plate 5, the linear guide rail R is displaced toward the reference surface L by the reaction force which is exerted on the first pressure contacting piece 7 and which is transmitted through the pressing plate 5 and the second pressure contacting piece 6. Then the guide rail R is brought into contact with and pressed against the reference surface L. In this state, as shown in FIG. 7(b), the pressing plate 5 is firmly secured to the installation surface f with the upper surface 5a thereof being nearly in flush with the top ends of the first and second pressure contacting pieces 7 and 6. Thus, the linear guide rail R is held by a plurality of longitudinally spaced apart holding units 8 precisely along the vertical reference surface L. Finally, the bolts 2 are tightened to maintain the holding state of the linear guide rail R.

Figure 15:
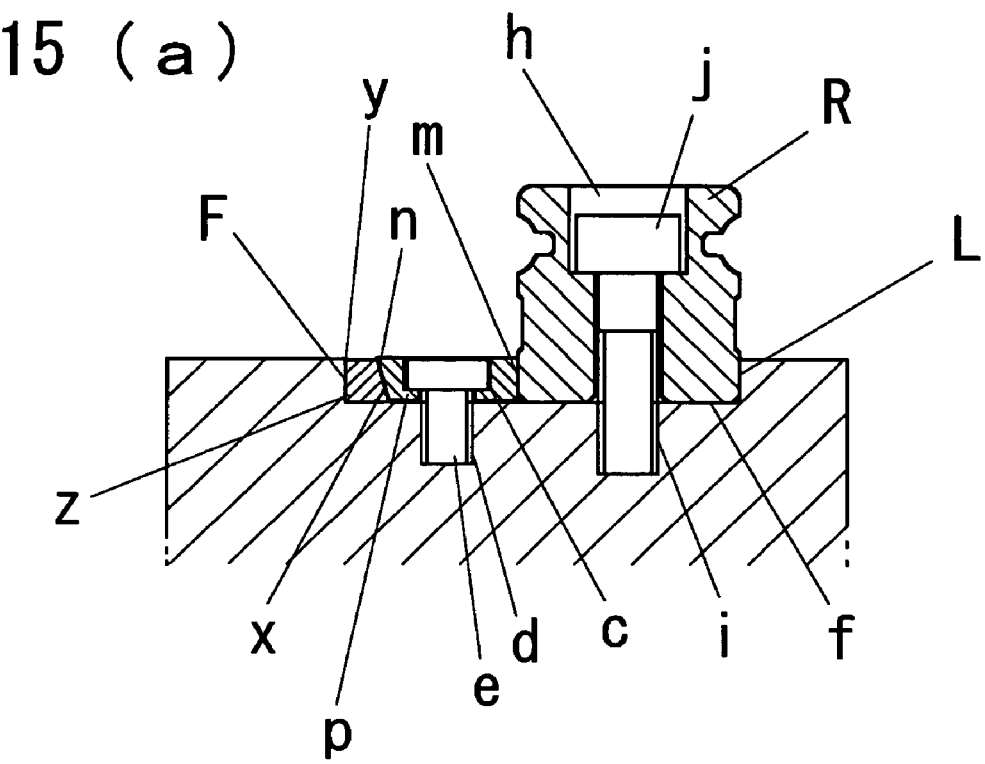
FIG. 15(a) is a sectional view similar to FIG. 7(b) showing a conventional linear guide rail holding device in its operated state.
FIG. 15(b) is a sectional view similar to FIG. 15(a) showing the operation of the device of FIG. 15(a) in its failed state.
Figure 15:
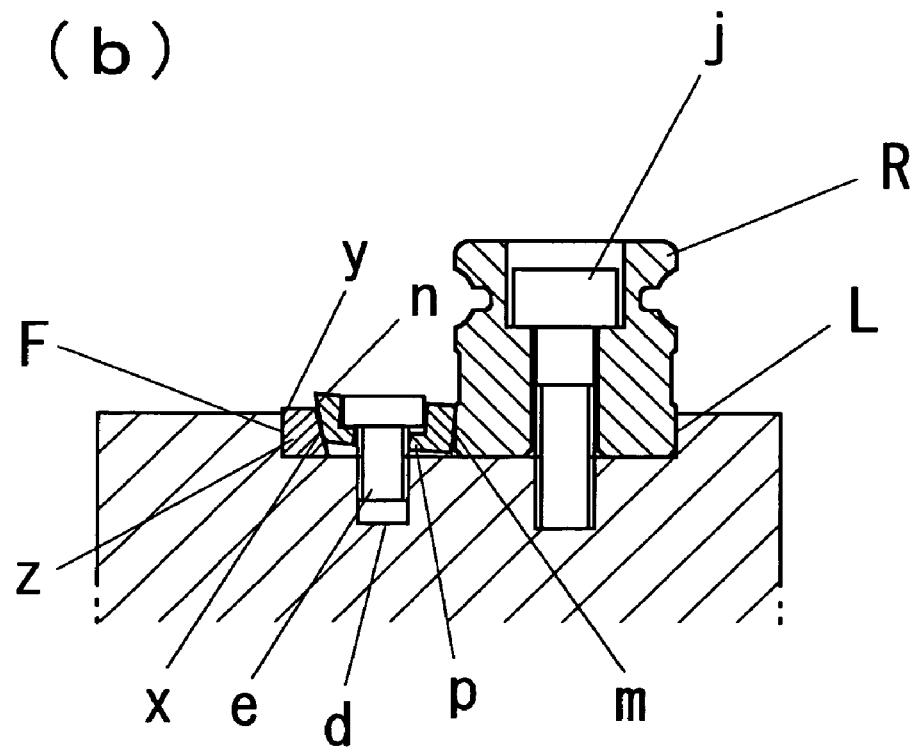

With the holding device according to the present invention constituted as above, the first and second pressure contacting pieces 7 and 6 serve to function like as "wedges" inserted on both sides of the pressing plate 5 and to balance the pressing forces acting on the reference surface L and the counter surface F. Further, the pressing plate 5 receives nearly the same reaction force from the first and second pressure contacting pieces 7 and 6 and, therefore, is smoothly lowered in a stable manner. Thus, the above-described defect of the holding device as shown in FIGS. 15(a) and 15(b) can be overcome. Additionally, since the length of the displacement of the pressure contacting pieces is greater as compared with the device of FIG. 15(a), there is available an ample space for positioning the holding units 8 before tightening the screw 31. This also allows for the correction of the position of the pressing plate 5 and the first and second pressure contacting pieces 7 and 6 during the course of tightening of the screw 31.

Figure 8:
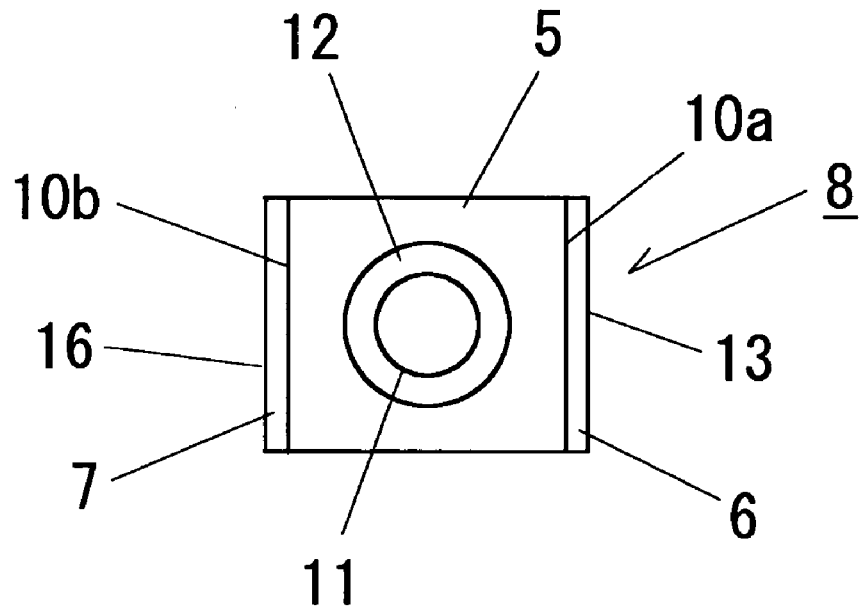
FIG. 8(a) is a plan view of a pressing plate and pressure contacting pieces according to another embodiment of the present invention.
FIG. 8(b) is a side view of FIG. 8(a)
Figure 8:
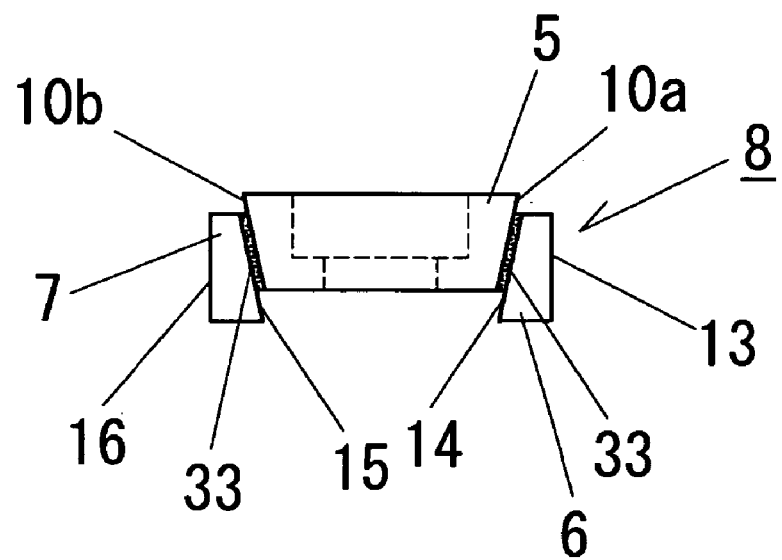

For reasons of convenience during storage and rail holding operation, it is preferred that the pressing plate 5 and the first and second pressure contacting pieces 7 and 6 be detachably assembled into a unitary body. Such a unitary body can be formed by various means using, for example, an adhesive agent, an adhesive tape or magnetic force. Thus, in an embodiment shown in FIGS. 8(a) and 8(b), the tapered side faces 15 and 14 of the first and second pressure contacting pieces 7 and 6 are detachably bonded with an elastic adhesive 33 to the first and second tapered surfaces 10b and 10a of the pressing member 5, respectively, into a unitary body. When such a holding unit assembled into a unitary structure is attached to one of the female thread holes 30 and when the screw 31 is tightened into the thread hole 30, the bonding is destroyed and the pressing plate 5 is displaced downward with the first and second tapered surfaces 10b and 10a thereof sliding down on the tapered side faces 15 and 14 of the first and second pressure contacting pieces 7 and 6 in the same manner as described with reference to the holding device of FIGS. 1–3. It is not necessary that the bonding force created by the elastic adhesive agent should be strong. Rather, the bonding is such as to permit the positioning and holding of the linear guide rail by the tightening of the screw 31 into the female thread hole 30. The assembly into a unitary structure is advantageous in that the storage, handling and attachment work thereof are easy and convenient. In particular, the lateral alignment of respective parts can be maintained during the attachment work. The adhesive, which is applied in the interface between the pressing plate 5 and the first and second pressure contacting pieces 7 and 6, does no cause blocking, sticking and staining problems.

Figure 9:
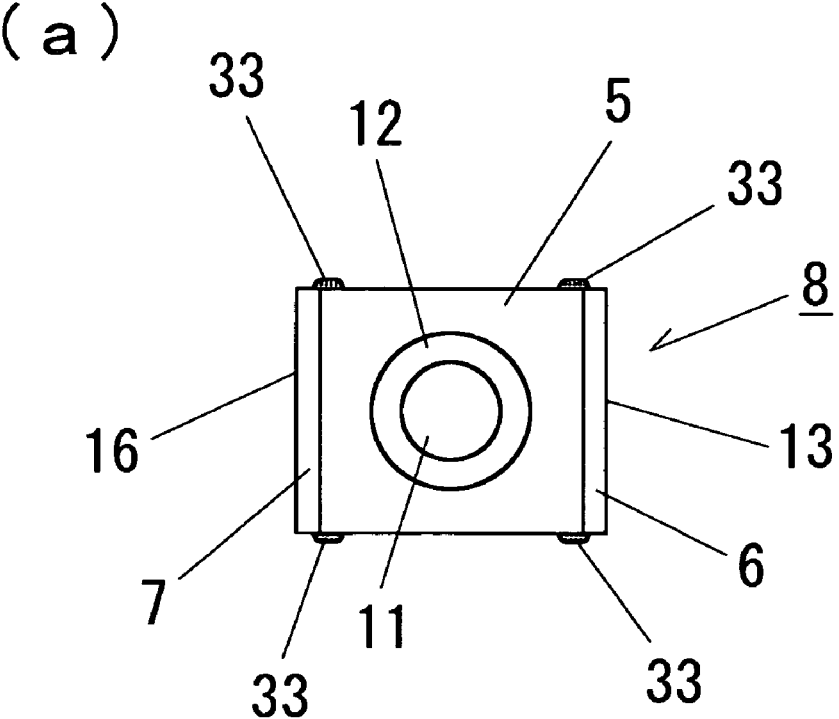
FIG. 9(a) is a plan view of a pressing plate and pressure contacting pieces according to a further embodiment of the present invention.
FIG. 9(b) is a side view of FIG. 9(a)
Figure 9:
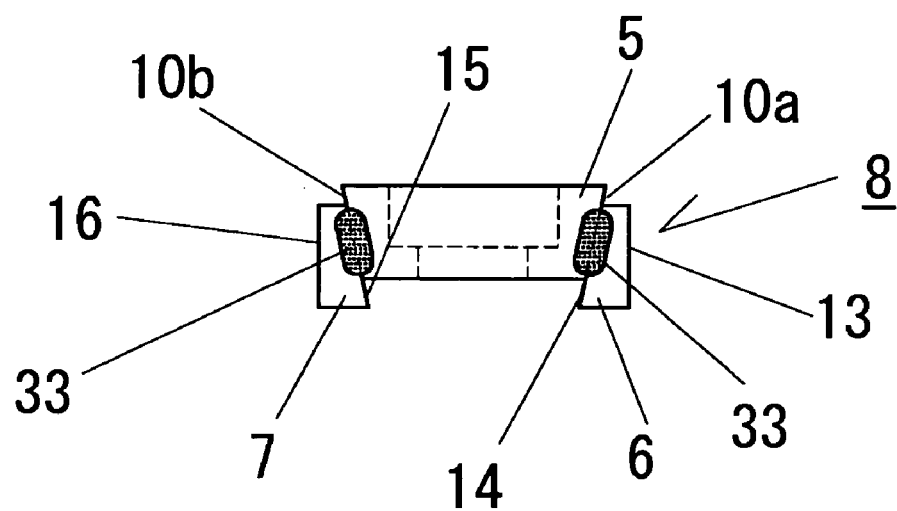

The assembling of the holding unit 8 into a unitary structure may be also achieved as shown in FIGS. 9(a) and 9(b). In this embodiment, the first and second pressure contacting pieces 7 and 6 and the pressing member 5 have the same longitudinal lengths and are positioned such that the both longitudinal ends thereof are on the same plane, and an elastic adhesive 33 is applied on each of the both longitudinal ends thereof at respective boundaries therebetween so that the first and second pressure contacting pieces 7 and 6 and the pressing member 5 are detachably bonded into a unitary body. This structure is advantageous in that the storage, handling and attachment work are easy and convenient without adversely affecting the tightening of the screw 31 into the female thread hole 30.

Figure 10:
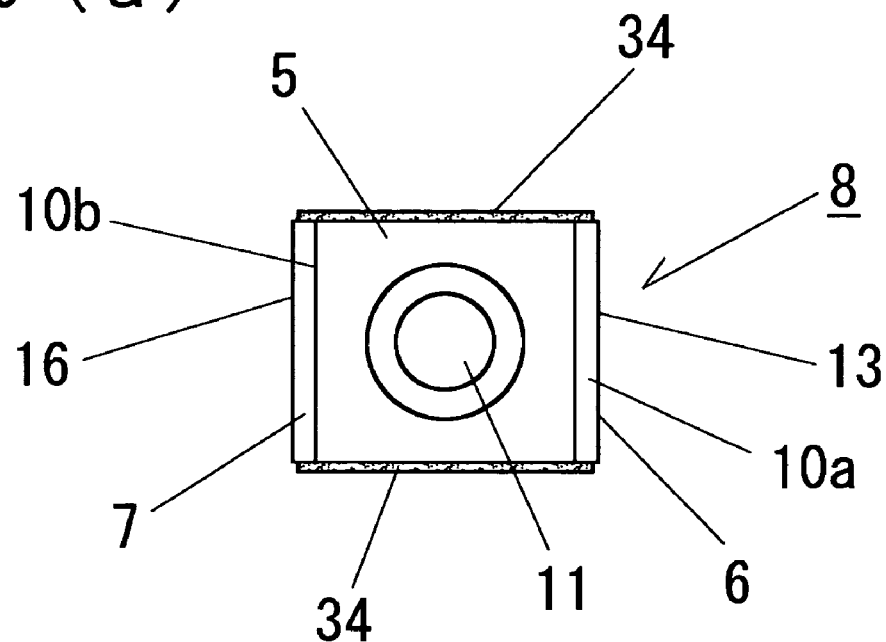
FIG. 10(a) is a plan view of a pressing plate and pressure contacting pieces according to a further embodiment of the present invention.
FIG. 10(b) is a side view of FIG. 10(a)
Figure 10:
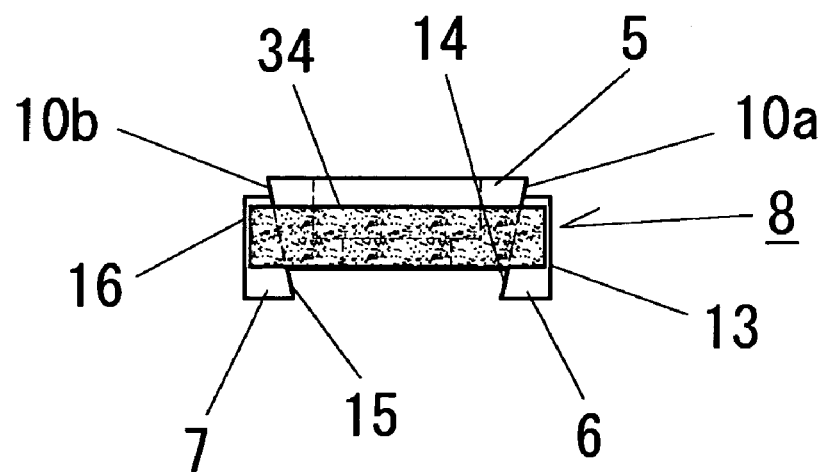

FIGS. 10(a) and 10(b) depict a further embodiment of the assembling of the holding unit 8 into a unitary structure. In this embodiment, the first and second pressure contacting pieces 7 and 6 and the pressing member 5 have the same longitudinal lengths and are positioned such that the both longitudinal ends thereof are on the same plane, and an adhesive tape is applied to each of the both longitudinal ends thereof to cover respective boundaries therebetween so that the first and second pressure contacting pieces 7 and 6 and the pressing member 5 are detachably bonded into a unitary body. This structure is advantageous in that the storage, handling and attachment work are easy and convenient without adversely affecting the tightening of the screw 31 into the female thread hole 30. When the holding unit 8 is detached after loosening the screw 31, a new tape may be applied thereto to assemble respective parts.

The assembling of the holding unit 8 into a unitary structure may also be achieved by constructing the first and second pressure contacting pieces 7 and 6 using a magnetic material while forming the pressing plate 5 using a material capable of magnetically bonding with the pressure contacting pieces 7 and 6. This structure can also attain the effects that the storage, handling and attachment work are easy and convenient without adversely affecting the tightening of the screw 31 into the female thread hole 30.

In one preferred embodiment, each of the first and second pressure contacting pieces 7 and 6 is configured to be engageable with the pressing member 5 such that longitudinal movement of the first and second pressure contacting pieces 7 and 6 relative to the pressing member 5 is prevented.

Figure 11:
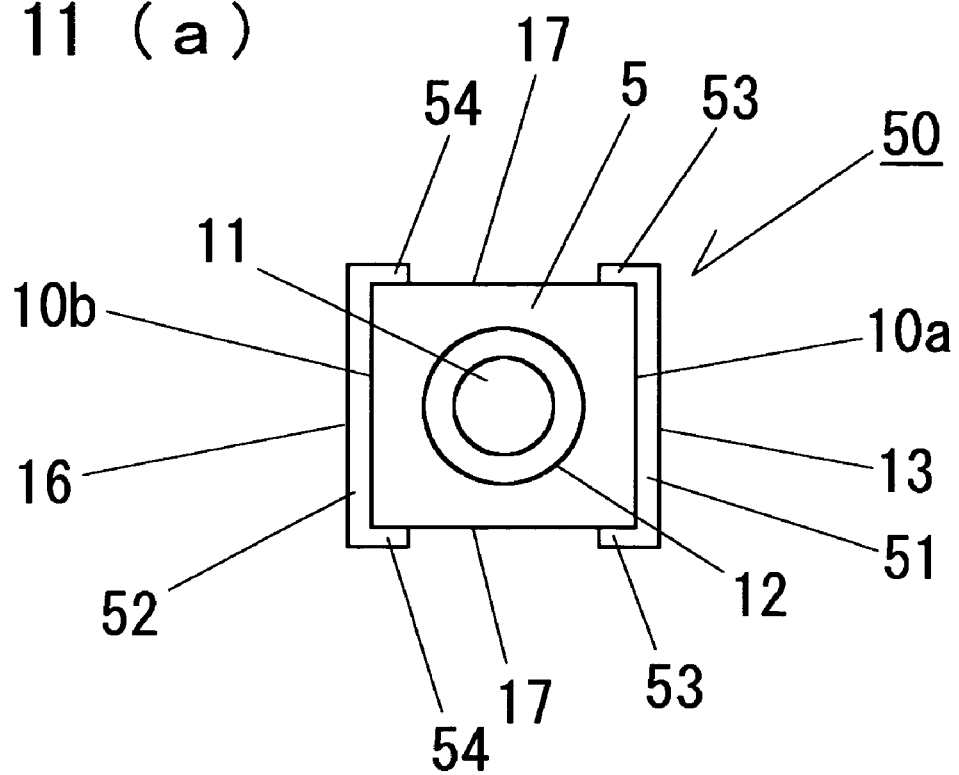
FIG. 11(a) is a plan view of a pressing plate and pressure contacting pieces according to a further embodiment of the present invention.
FIG. 11(b) is a side view of FIG. 11(a)
Figure 11:
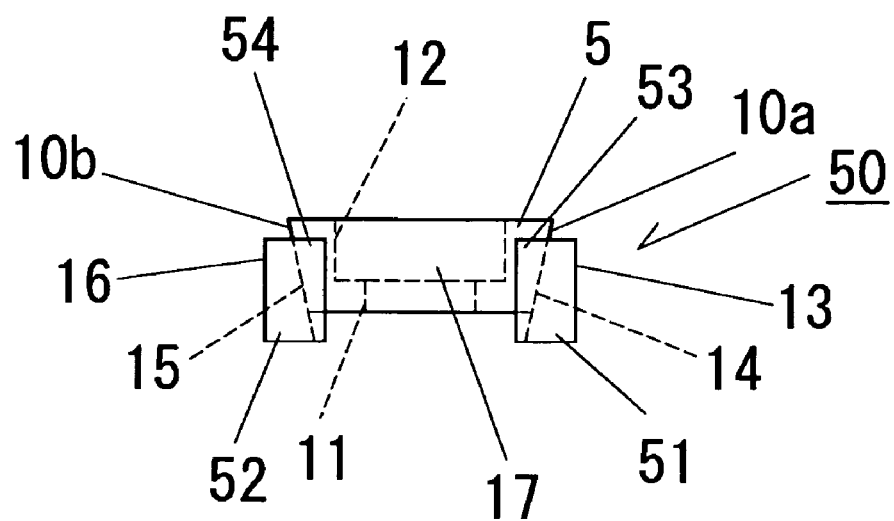

Such an embodiment is illustrated in FIGS. 11(*a*) and 11(*b*), in which the same reference numerals as those in FIGS. 1–3 designate similar component parts. Thus, detailed explanation for those component parts is not repeated here to avoid redundancy. Designated generally as 50 is a holding unit of the present invention which includes a pair of first and second pressure contacting pieces 52 and 51, and a pressing plate 5 having a structure similar to that shown in FIGS. 1–3. Similar to the embodiment shown above with reference to FIGS. 1–3, the first pressure contacting piece 52 has a tapered side face 15 which is vertically slidably face-to-face engageable with a first tapered side surface 10*b* of the pressing plate 5 and a vertical side face 16 opposite to the tapered side face 15 and face-to-face engageable by a vertical counter surface F (FIG. 1). Similarly, the second pressure contacting piece 51 has a tapered side face 14 which is vertically slidably face-to-face engageable by a second tapered side surface 10*a* of the pressing plate 5 and a vertical side face 13 opposite to the tapered side face 14 and face-to-face engageable with a first side Ra of a linear guide rail R (FIG. 1). The first pressure contacting piece 52 has opposite longitudinal ends provided with side walls 54 and 54 to define, together with the tapered side face 15, a groove in which the pressing plate 5 is fittable such that opposing side surfaces 17 and 17 of the pressing plate 5 are in slidable contact with the side walls 54 and 54 and that the first tapered side surface 10*b* is in slidable contact with the tapered side face 15. Similarly, the second pressure contacting piece 51 has opposite longitudinal ends provided with side walls 53 and 53 to define, together with the tapered side face 14, a groove in which the pressing plate 5 is fittable such that opposing side surfaces 17 and 17 of the pressing plate 5 are in slidable contact with the side walls 53 and 53 and that the second tapered side surface 10*a* is in slidable contact with the tapered side face 14. Because of the presence of the side walls 53 and 54, longitudinal movement of the pressing plate 5 relative to the first and second pressure contacting pieces 52 and 51 is prevented. Therefore, the holding of the linear guide rail R along the reference surface L can be facilitated and achieved in a stable manner.

Figure 12:
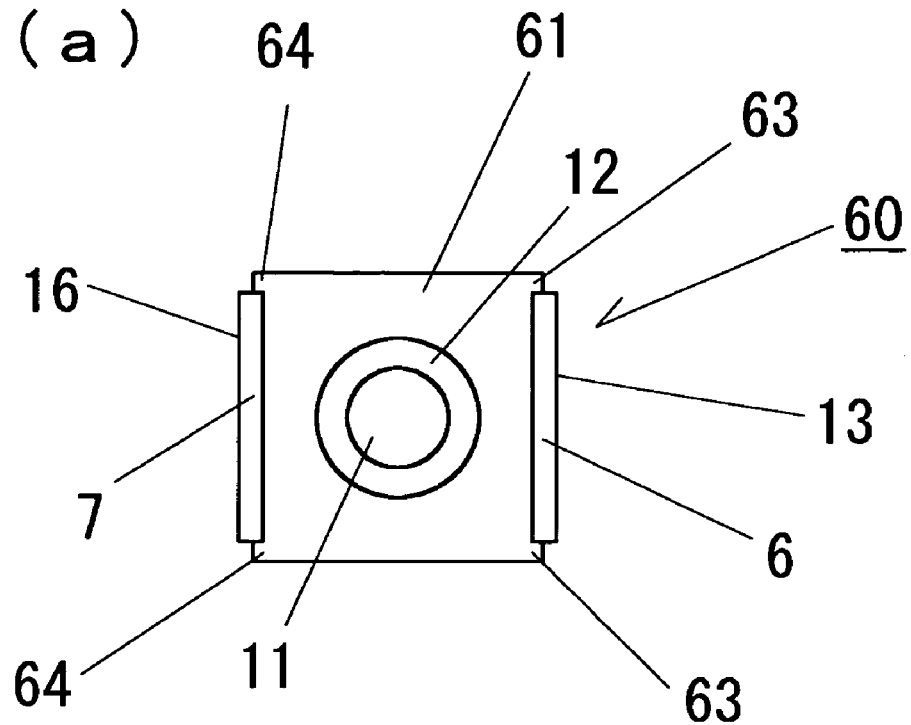
FIG. 12(a) is a plan view of a pressing plate and pressure contacting pieces according to a further embodiment of the present invention.
FIG. 12(b) is a side view of FIG. 12(a)
Figure 12:
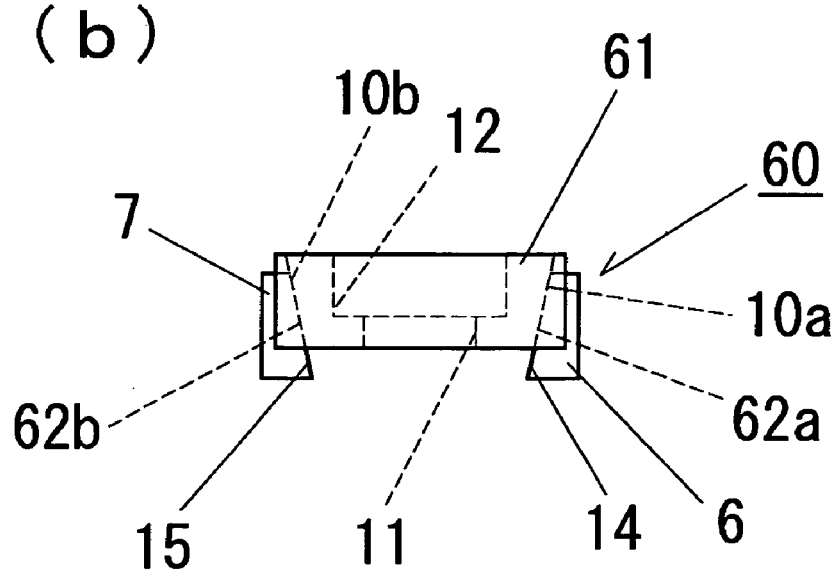

An alternate embodiment having means for preventing longitudinal movement is shown in FIGS. 12(*a*) and 12(*b*) in which the same reference numerals as those in FIGS. 1–3 designate similar component parts. Thus, detailed explanation for those component parts is not repeated here to avoid redundancy. Designated generally as 60 is a holding unit of the present invention which includes a pair of first and second pressure contacting pieces 7 and 6, and a pressing plate 61. Similar to the embodiment shown above with reference to FIGS. 1–3, the first pressure contacting piece 7 has a tapered side face 15 which is vertically slidably face-to-face engageable with a first tapered side surface 10*b* of the pressing plate 61 and a vertical side face 16 opposite to the tapered side face 15 and face-to-face engageable by a vertical counter surface F (FIG. 1). Similarly, the second pressure contacting piece 6 has a tapered side face 14 which is vertically slidably face-to-face engageable by a second tapered side surface 10*a* of the pressing plate 61 and a vertical side face 13 opposite to the tapered side face 14 and face-to-face engageable with a first side Ra of a linear guide rail R (FIG. 1). The pressing plate 61 has a pair of side walls 64 and 64 each extending laterally outward from the first tapered side surface 10*b* to define a first groove 62*b* in which a portion of the first pressure contacting piece 7 including the tapered side face 15 is vertically slidably fittable. Similarly, the pressing plate 61 has a pair of side walls 63 and 63 each extending laterally outward from the second tapered side surface 10*a* to define a second groove 62*a* in which a portion of the second pressure contacting piece 6 including the tapered side face 14 is vertically slidably fittable. Because of the presence of the side walls 63 and 64, longitudinal movement of the pressing plate 61 relative to the first and second pressure contacting pieces 7 and 6 is prevented. Therefore, the holding of the linear guide rail R along the reference surface L can be facilitated and achieved in a stable manner.

Figure 13:
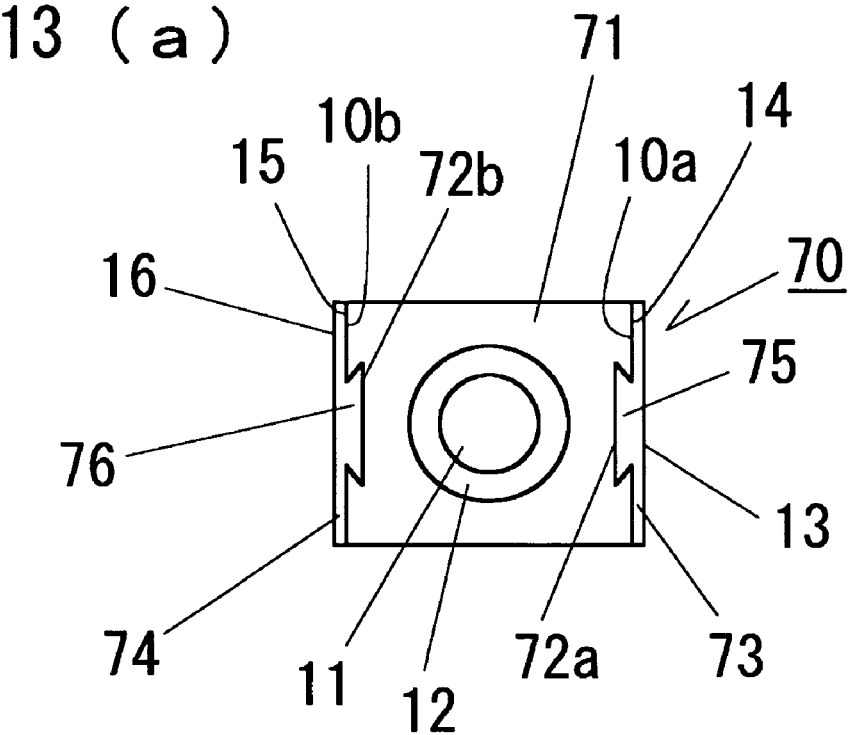
FIG. 13(a) is a plan view of a pressing plate and pressure contacting pieces according to a further embodiment of the present invention.
FIG. 13(b) is a vertical cross-sectional view of FIG. 13(a)
Figure 13:
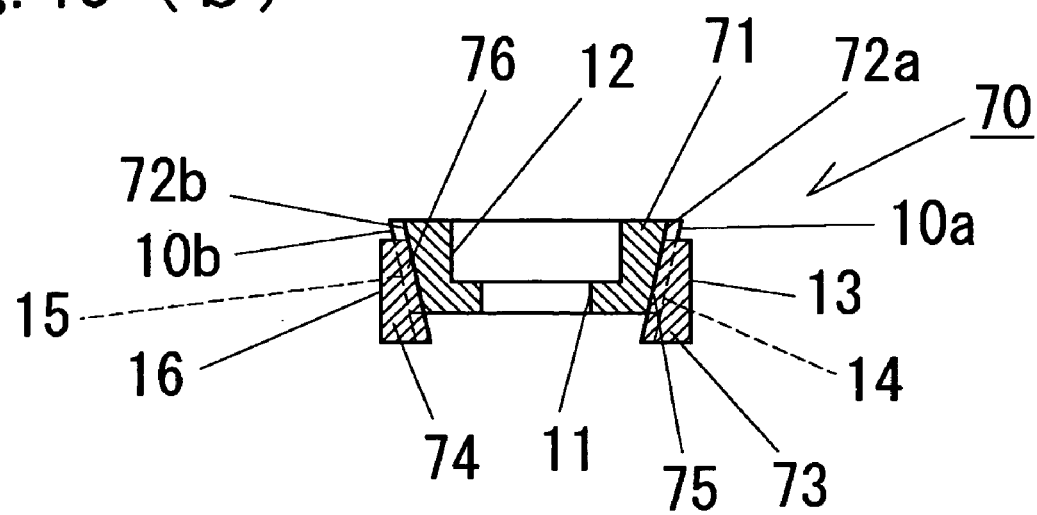
Figure 14:
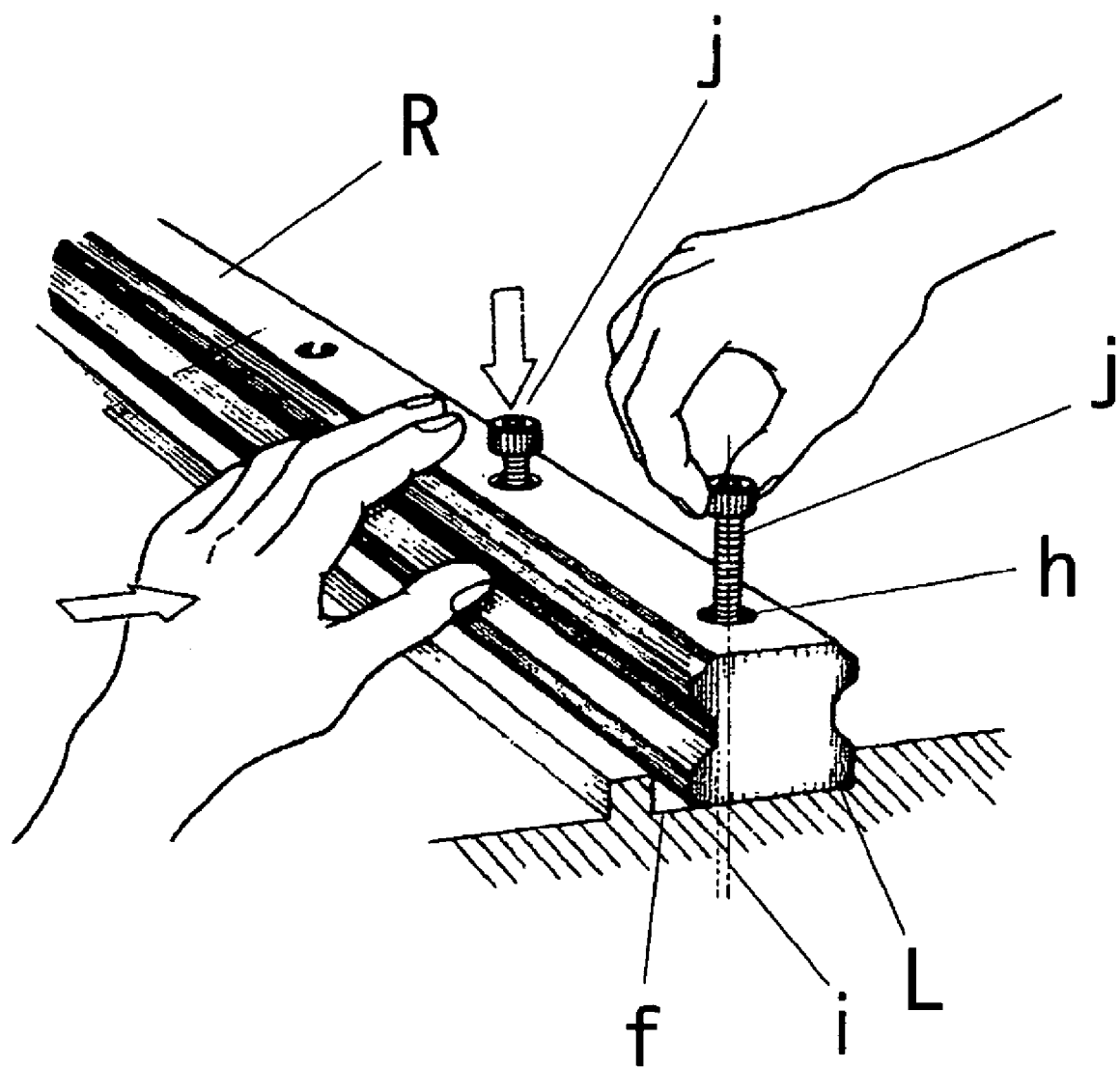
FIG. 14 is a perspective view illustrating conventional device for holding a liner guide rail.

A further embodiment having means for preventing longitudinal movement is shown in FIGS. 13(*a*) and 13(*b*) in which the same reference numerals as those in FIGS. 1–3 designate similar component parts. Thus, detailed explanation for those component parts is not repeated here to avoid redundancy. Designated generally as 70 is a holding unit of the present invention which includes a pair of first and second pressure contacting pieces 74 and 73, and a pressing plate 71. Similar to the embodiment shown above with reference to FIGS. 1–3, the first pressure contacting piece 74 has a tapered side face 15 which is vertically slidably face-to-face engageable with a first tapered side surface 10*b* of the pressing plate 71 and a vertical side face 16 opposite to the tapered side face 15 and face-to-face engageable by a vertical counter surface F (FIG. 1). Similarly, the second pressure contacting piece 73 has a tapered side face 14 which is vertically slidably face-to-face engageable by a second tapered side surface 10*a* of the pressing plate 71 and a vertical side face 13 opposite to the tapered side face 14 and face-to-face engageable with a first side Ra of a linear guide rail R (FIG. 1). The first tapered side surface 10*b* of the pressing plate 71 has a first groove 72*b*, while the tapered side face 15 of the first pressure contacting piece 74 has a first ridge 76 engageable with the first groove 72*b*. Similarly, the second tapered side surface 10*a* of the pressing plate 71 has a second groove 72*a*, while the tapered side face 14 of the second pressure contacting piece 73 has a second ridge 75 engageable with the second groove 72*a*. When a screw 31 (FIG. 3) inserted into a fitting hole 11 of the pressing plate 71 is rotated and is advanced into a female thread hole 30 (FIG. 3), the pressing plate 31 is gradually lowered so that the first and second pressure contacting pieces 74 and 73, whose tapered side faces 15 and 14 are face-to-face engagement with the first and second tapered surfaces 10*b* and 10*a* of the pressing plate 71, laterally slide on the installation surface f (FIG. 3) in opposite directions. Thus, the holding unit 70 can hold the linear guide rail in position in the same manner as described with reference to FIGS. 1–3. Because of the engagement between the grooves 72*b* and 72*a* with the ridges 76 and 75, longitudinal movement of the pressing plate 71 relative to the first and second pressure contacting pieces 74 and 73 is prevented. Therefore, the holding of the linear guide rail R along the reference surface L can be facilitated and achieved in a stable manner. In the embodiment shown in FIGS. 13(a) and 13(b), each of the grooves 72a and 72b is shaped such that the mouth thereof is smaller in size than the bottom thereof, and the ridges 75 and 76 are shaped correspondingly. This structure can assemble the holding unit 70 into a unitary structure. The shape of the grooves 72a and 72b is not specifically limited, however. For example, the grooves 72a and 72b may be U-shaped forms, with the ridges 75 and 76 being formed correspondingly to be fittable therewith. If desired, similar grooves may be formed in the first and second pressure contacting pieces, with ridges being formed in both sides of the pressing plate.

Similar to the holding unit 8, the above-described holding units 50, 60 and 70 may be provided with the elastic adhesive material 33 or an adhesive tape 34 or may be formed of magnetically bondable materials, so as to assemble the pressing plate and first and second pressure contacting pieces together into a unitary body.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A device for holding a linear guide rail along a linearly extending vertical reference surface formed on an installation surface, said linear guide rail having a first side and a second side opposite said first side, said installation surface being provided with a vertical counter surface spaced apart from and in parallel with said reference surface and having a female thread hole formed between said reference surface and said counter surface, said holding device comprising:

a pressing plate having a vertically extending central fitting hole through which a screw is insertible and a pair of opposing, inwardly downwardly tapered, first and second side surfaces, said screw being threadedly engageable with said female thread hole so that said pressing plate is fixed on said installation surface when said screw inserted through said central fitting hole is tightened into said female thread hole;

a first pressure contacting piece having a tapered side face which is face-to-face engageable by said first tapered side surface of said pressing plate and a vertical side face opposite to said tapered side face and face-to-face engageable by said vertical counter surface; and a second pressure contacting piece having a tapered side face which is face-to-face engageable by said second tapered side surface of said pressing plate and a vertical side face opposite to said tapered side face and face-to-face engageable with said first side of said linear guide rail, wherein when said linear guide rail, said pressing plate and said first and second pressure contacting pieces are arranged on said installation surface such that said first pressure contacting piece is located between said first tapered side surface of said pressing plate and said vertical counter surface, said second pressure contacting piece is located between said second tapered side surface of said pressing plate and said first side of said linear guide rail and said linear guide rail is rested with said second side thereof being adjacent to said vertical reference surface and when said screw inserted through said central fitting hole of said pressing plate is tightened into said female thread hole, said first and second pressure contacting pieces are brought into pressure contact with said vertical counter surface and said first side of said linear guide rail, respectively, to press said linear guide rail against said vertical reference face.

2. A device as claimed in claim 1, wherein said tapered side faces of said first and second pressure contacting pieces are detachably bonded with an elastic adhesive to said first and second tapered surfaces of said pressing member, respectively, into a unitary body.

3. A device as claimed in claim 1, wherein said first and second pressure contacting pieces and said pressing member have the same longitudinal lengths and are positioned such that the both longitudinal ends thereof are on the same plane, and wherein an elastic adhesive is applied on each of the both longitudinal ends thereof at respective boundaries therebetween so that said first and second pressure contacting pieces and said pressing member are detachably bonded into a unitary body.

4. A device as claimed in claim 1, wherein said first and second pressure contacting pieces and said pressing member have the same longitudinal lengths and are positioned such that the both longitudinal ends thereof are on the same plane, and wherein an adhesive tape is applied to each of the both longitudinal ends thereof to cover respective boundaries therebetween so that said first and second pressure contacting pieces and said pressing member are detachably bonded into a unitary body.

5. A device as claimed in claim 1, wherein each of said first and second pressure contacting pieces is engageable with said pressing member such that longitudinal movement of said first and second pressure contacting pieces relative to said pressing member is prevented.

6. A device as claimed in claim 5, wherein said first pressure contacting piece has a pair of side walls each extending laterally from said tapered side face to define a first groove in which a portion of said pressing plate including said first tapered side surface is vertically slidably fittable and wherein said second pressure contacting piece has a pair of side walls each extending laterally from said tapered side face to define a second groove in which a portion of said pressing plate including said second tapered side surface is vertically slidably fittable.

7. A device as claimed in claim 5, wherein said pressing plate has a pair of side walls each extending laterally from said first tapered side surface to define a first groove in which a portion of said first pressure contacting piece including said tapered side face is vertically slidably fittable and wherein said pressing member has a pair of side walls each extending laterally from said second tapered side surface to define a second groove in which a portion of said second pressure contacting piece including said tapered side face is vertically slidably fittable.

8. A device as claimed in claim 5, wherein one of said tapered side face of said first contacting piece and said first tapered side surface is provided with a groove and the other is provided with a ridge enageable with said groove such that the longitudinal movement of said first contacting piece relative to said pressing member is prevented, and wherein one of said tapered side face of said second contacting piece and said second tapered side surface is provided with a groove and the other is provided with a ridge enageable with said groove such that the longitudinal movement of said second contacting piece relative to said pressing member is prevented.

9. A device for holding a linear guide rail having a first side and a second side opposite said first side, comprising:
- a base provided with a longitudinally extending groove defined by a vertical reference surface, a vertical counter surface in parallel with and laterally spaced apart from said vertical reference surface and a bottom installation surface extending between said vertical reference surface and said vertical counter surface in the direction normal thereto and provided with a plurality of longitudinally spaced apart female thread holes, said groove being configured such that said linear guide rail is rested on said bottom surface between said vertical reference surface and said female thread holes; and
- a plurality of holding units provided for respective female thread holes, each of said holding units comprising:
- a pressing plate having a pair of opposing upper and lower surfaces, a pair of opposing first and second side surfaces and a central fitting hole which extends vertically from the upper surface to the lower surface and through which a screw is insertible, each of said first and second side surfaces being tapered such that the cross-sectional area of the pressing plate continuously decreases in the direction from the upper surface to the lower surface, said screw being threadedly engageable with the corresponding female thread hole so that said pressing plate is fixed on said installation surface when said screw inserted through said central fitting hole is tightened into said female thread hole;
- a first pressure contacting piece having a bottom face laterally slidably engageable with said installation surface, a tapered side face which is vertically slidably face-to-face engageable with said first tapered side surface of said pressing plate and a vertical side face opposite to said tapered side face and face-to-face engageable by said vertical counter surface; and
- a second pressure contacting piece having a bottom face laterally slidably engageable with said installation surface, a tapered side face which is vertically slidably face-to-face engageable by said second tapered side surface of said pressing plate and a vertical side face opposite to said tapered side face and face-to-face engageable with said first side of said linear guide rail,
- wherein when said linear guide rail, said pressing plate and said first and second pressure contacting pieces are arranged on said installation surface in such a positional relationship that said first pressure contacting piece is located between said first tapered side surface of said pressing plate and said vertical counter surface, said second pressure contacting piece is located between said second tapered side surface of said pressing plate and said first side of said linear guide rail and said linear guide rail is rested with said second side thereof being adjacent to said vertical reference surface and when said screw inserted through said central fitting hole of said pressing plate is tightened into said female thread hole, said first and second pressure contacting pieces are brought into pressure contact with said vertical counter surface and said first side of said linear guide rail, respectively, to press said linear guide rail against said vertical reference face.

* * * * *